March 11, 1952  J. S. ZARAT  2,589,182
CHILD'S VEHICLE
Filed Aug. 27, 1949  2 SHEETS—SHEET 1
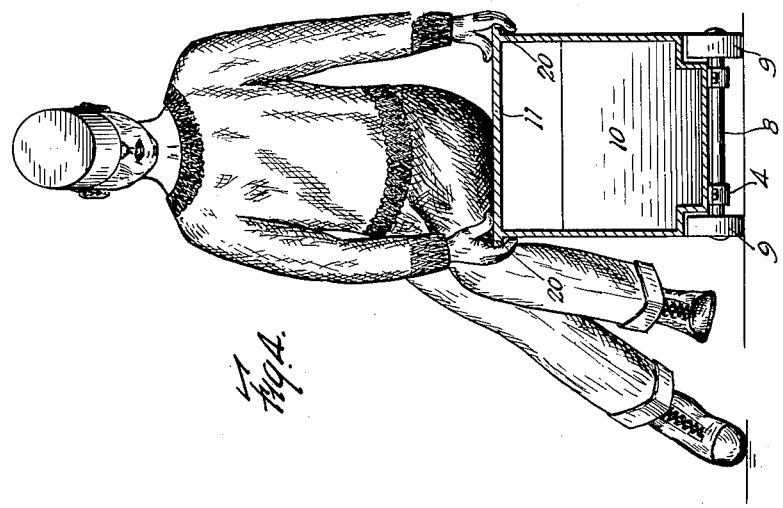
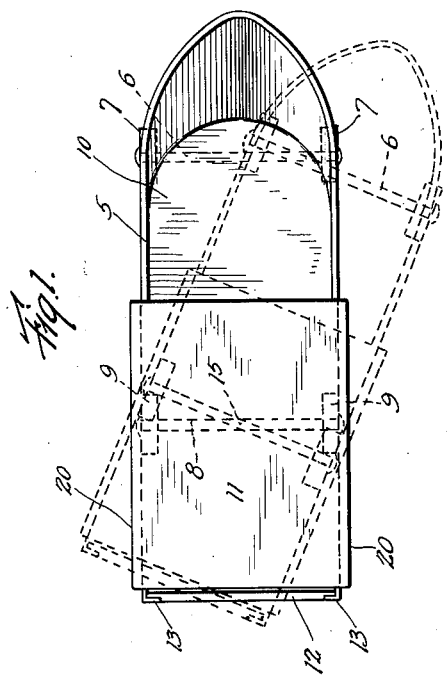
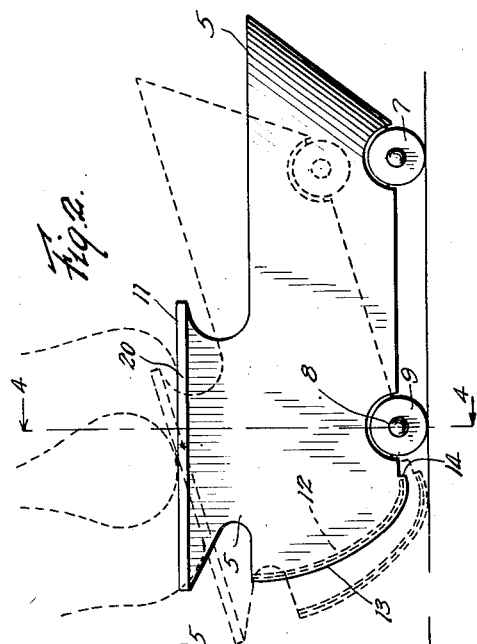
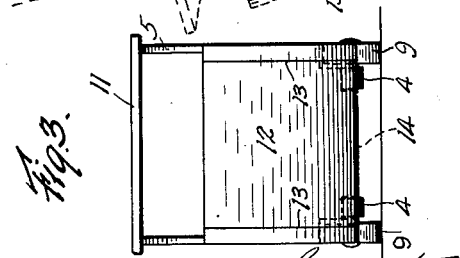
Inventor:
Joseph S. Zarat.

March 11, 1952 J. S. ZARAT 2,589,182
CHILD'S VEHICLE
Filed Aug. 27, 1949 2 SHEETS—SHEET 2

INVENTOR.
Joseph S. Zarat
BY
Thiess, Olson & Mecklenburger
attys

Patented Mar. 11, 1952

2,589,182

UNITED STATES PATENT OFFICE 2,589,182

CHILD'S VEHICLE

Joseph S. Zarat, Fox Lake, Ill.

Application August 27, 1949, Serial No. 112,735

5 Claims. (Cl. 280—87.01)

The present invention relates to improvements in a child's wagon or vehicle, particularly of the type which is characterized by extreme simplicity in manipulation, propulsion, and steering. This application is a continuation in part of my copending application Serial No. 649,470, filed February 23, 1946, (now abandoned).

Various types of small vehicles suitable for use by children have been proposed, which vehicles are of the type that is propelled by the person seated on the vehicle thrusting against the ground with his feet. Most of these vehicles, however, are provided with dirigible means by which the forward set of wheels may be suitably turned to allow the vehicle to be steered much in the manner of an automobile. These vehicles, however, require rather cumbersome and complicated construction, which render such vehicles relatively expensive and also subject to breakdown in use, thus requiring repairs by a mechanic skilled in such work.

The vehicle of the present invention dispenses with a separate steering gear, and may be steered by the expedient of raising the forward or front wheels from the ground, whereafter the two rear wheels are free for rotation about a point centrally of their common axis. The raising of the front wheels is accomplished by the rider shifting his weight toward the rear of the vehicle, after which, by appropriate thrust of his foot against the ground, the direction of motion of the entire vehicle may be changed.

It is therefore one of the objects of the present invention to provide an inexpensive, easily constructed, and sturdy dirigible vehicle capable of simple operation by a child.

A further object of the invention is to provide in a vehicle of the type aforesaid, means for arresting its movement.

A further object of the invention is to provide a vehicle of the type aforesaid having means limiting the tilting of the vehicle about the rear axis, said means also being the braking means.

A further object of the invention is to provide a vehicle which has a large load carrying capacity, yet is readily maneuverable by a child.

A further object of the invention is to provide a vehicle which enables a child to assume a comfortable, substantially erect sitting position while maneuvering said vehicle.

A still further object of this invention is to provide a vehicle capable of transporting numerous parcels or bundles and adapted to be readily maneuvered by a child mounted thereon while in a comfortable, substantially erect sitting position.

Other objects of the invention will appear from the further description herein and from the drawing, in which latter:

Fig. 1 is a top plan view of one form of a vehicle, also showing a changed position in dotted lines;

Fig. 2 is a side elevational view of the vehicle shown in Fig. 1, also showing a changed position in dotted lines;

Fig. 3 is a rear elevational view of the vehicle shown in Fig. 1;

Fig. 4 is a section along the line 4—4 of Fig. 2 looking forward, and showing a child seated upon the vehicle in the act of propelling the same;

Figure 5:
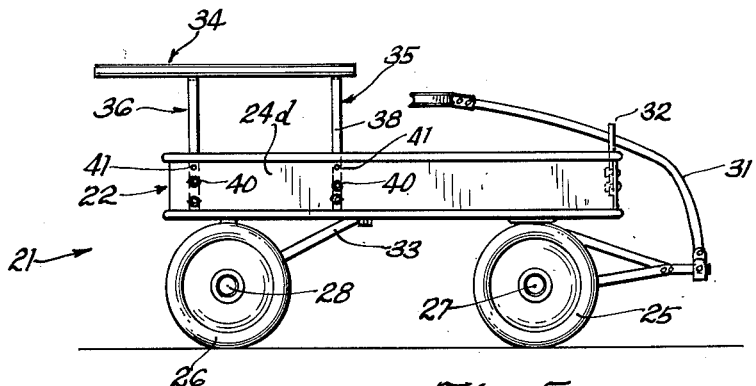
Fig. 5 is a side elevational view of a modified form of vehicle.

One form of the vehicle 3 is shown in Figs. 1–4 comprising a preferably sheet-metallic body portion 5 which may have any appropriate form, for example that shown, which body portion is provided with a forward axle 6 carrying a pair of wheels 7, the axle being attached to the body portion by straps 4, although the wheels may be fixed to the axle and the latter adapted for rotation in the straps. There is also provided a rear axle 8 carrying a pair of wheels 9, this axle being immovable relative to the body portion 5 and secured thereto by means of straps 4. The body portion 5 may, if desired, be made in the form of a container somewhat in the shape of a bathtub to provide space for the transportation of articles within the well 10.

Positioned substantially above or in superposed relation with the rear axle 8 is a platform seat 11, which is preferably the full width of the vehicle and upon which the rider seats himself, preferably with his centroid disposed in a vertical plane through the axis of the axle 8 and in a vertical plane through the longitudinal axis of the vehicle. Where I refer to the transverse midline of the seat I intend to mean that line above which the centroid of the rider's body will be positioned during normal propulsion of the vehicle. It will be understood that the seat may be terminated fore and aft at any convenient position. For example, although the seat is shown terminated rearwardly of the front end of the vehicle in order to permit articles to be carried within the body, such showing is obviously not limitative. However, it will be apparent that if the rider's centroid is forwardly of the rear wheels the tilting action necessary for steering cannot be accomplished. In such event, the rider would be obliged to shift his entire body rearwardly to present his centroid above the rear axle. As shown, the platform 11 may be formed as a continuation of the sides of the body 5 by appropriate bending of the metal or by attachment thereto. Platform 11 is extended laterally on both sides beyond the sides of the body 5 to provide gripping flanges 20 for the hands (Fig. 4) and is arranged to overhang the rear axle as shown. Propulsion is effected by the child pushing against the ground with his feet.

The vehicle is so proportioned as to its weight and dimensions that a slight movement of the child's centroid to the rear of the vehicle, as by tilting or shifting his body, will cause the front end of the vehicle to be tilted upwardly and to assume a position shown in dotted lines in Fig. 2. In order to limit the extent of tilting of the vehicle, and to prevent the same from being completely overturned rearwardly, limiting means, for example a board 12, secured to the rear end of the body 5 by flanges 13 and 14, is provided. Board 12 may be of plywood having a slight resiliency in order that it may be slid into the flanges 13 and 14 and assume the convexedly outward contour as shown. Thus the board 12 and flanges 13 will, upon tilting of the vehicle, contact the ground and serve as a stabilizer as aforesaid.

When the vehicle has been tilted back as far, for instance, as shown in Fig. 2, the end of the board 12 and flanges 13 will, moreover, act as a brake in arresting further forward movement of the vehicle. This feature is, in effect, a limiting feature in arresting the forward progress of the vehicle if the operator should inadvertently tilt too far to the rear.

The steering of the vehicle is accomplished in the manner best illustrated in Fig. 1. Let it be assumed that the vehicle has been tilted rearwardly but not sufficiently to cause the board 12 and flanges 13 to take effect. As a result, the forward wheels 7 will now be out of contact with the ground, and by a suitable swerving and pedal movement, the child can cause the vehicle to swing about an axis 15, centrally of the wheels 9, either to the right or to the left. Upon the child resuming an erect position and causing the wheels 7 to re-contact the ground, the vehicle can now be propelled in the new direction. For better control of his own balance and of the vehicle, the child will grasp the flanges 20. By tilting his body or shifting his weight and lifting on the forward end of the flanges 20, manipulation of the vehicle is rendered relatively effortless.

Figure 6:
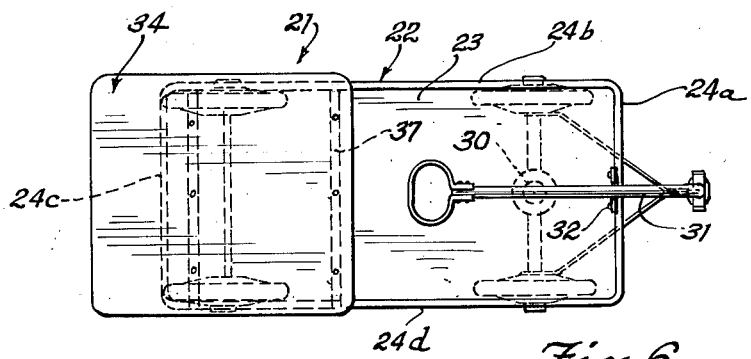
Fig. 6 is a top plan view of the vehicle shown in Fig. 5.
Figure 7:
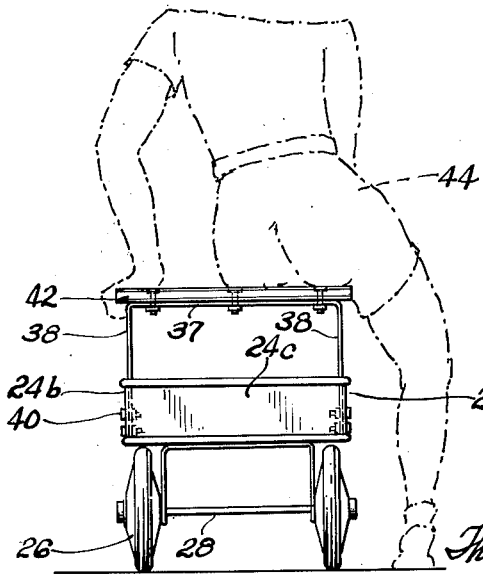
Fig. 7 is a rear elevational view of the vehicle shown in Fig. 5 and having a child, indicated by dotted lines, seated thereupon and in the act of propelling said vehicle.

A modified form 21 of the vehicle is shown in Figs. 5 through 7 comprising a body portion or member 22 having a base 23 and upwardly extending sides 24a, b, c, and d, which form a box-like receptacle with the base. Sets of wheels 25 and 26 are rotatably mounted on axles 27 and 28, respectively, which in turn are secured to the underside of the base 23. The front axle 27 is swivelly mounted on the underside of the base 23 at point 30. A steering column 31 extends rearwardly from and is pivotally connected to the front axle 27 and is adapted to normally seat in a yoke or fork 32 mounted on the front side 24a of the body portion 22. The column 31 is provided to enable the juvenile to pull the vehicle if he so desires. The rear axle 28 is held in a fixed relation with respect to the body portion 22 by bracing straps 33.

Supported by the sides 24b and d of body portion 22 and in superposed relation with respect to the rear end portion of the base 23 is a platform seat 34. The transverse centerline of the seat is disposed in a vertical plane passing through axle 28. Mounted on the underside of the seat are a pair of U-shaped supporting brackets 35 and 36. The length of the web section 37 of each bracket is the same as the spacing between the opposing surfaces of sides 24b and d. The downwardly extending sections 38 of each bracket are secured to the corresponding sides 24b and d by means of holding bolts 40, which extend through suitable openings 41 formed in the sides. Three or more equally spaced openings 41 are provided in the sides 24b and d to allow for vertical adjustment of the seat 34. The transverse dimension of the seat is in this instance slightly greater than the width of base 23, thus causing the edges 42 and 43 of the seat to overhang, whereby they may be gripped by the juvenile 44, when maneuvering the vehicle, as shown in Fig. 7. The vehicle 21 is maneuvered in the same way as heretofore described for vehicle 3.

In either vehicle the height of the platform seat above the ground should be greater than knee length and less than hip length of the child. Knee length for children between the ages of 5 to 12 is from 12 to 18 inches; the corresponding hip length is from 20 to 30 inches. Thus the height of the seat should be from 12 to 30 inches above the ground. The conventional or standard height of the seat would be approximately 20 inches above the ground.

One outstanding advantage of my invention as compared with prior known devices resides in the ease with which it may be operated for descending and ascending curbs. It will be apparent from the description and the drawings that by properly controlling the feet and by rearward tilting of his body, the rider may, upon approaching a curb from the sidewalk, drop the front end of the wagon to the roadway and by holding the edges of the seat with his hands and carrying the principal weight on his legs, let the rear end of the vehicle down to the roadway. Upon ascending the opposite side of the street, the operation would be similar but reversed.

It will be seen that no particular steering mechanism is required to direct the vehicle in a selected path. Accordingly even a very young child finds the vehicle within his skill.

It will be self-evident that the proportions shown are not controlling and that the well 10 or body portion 22 may be omitted if desired. However, they are particularly attractive to children, who may therefore use the vehicle as a means for conveying small articles, sand, toys, and the like, which adds considerably to the attraction of the device. Its extreme simplicity makes it easy to construct and to keep in repair.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A leg-propelled vehicle comprising a substantially horizontal flat seat, a body having side walls on which said seat is supported, a pair of rear ground-engaging wheels rotatable about an axis fixed with respect to said body, and a pair of front ground-engaging wheels rotatable about an axis fixed with respect to said body, said axes being parallel to each other, said seat extending on both sides of the medial vertical fore-and-aft plane of the vehicle beyond the side walls of the body, the medial portion of the seat being substantially directly above the rear axis, the rear axis being close to the rear end of the body; the height of said seat being greater than the average knee length of persons using such vehicles and less than the average leg length of such persons, whereby the person may extend both legs over a side of the seat, the upper portion of the inner leg resting on the seat and the lower portion of said inner leg hanging down from said seat and with the foot of said inner leg held above the ground level, and the outer leg being used to propel the vehicle by engagement of the foot thereof with the ground, said vehicle being provided with a pair of handles on opposite sides of said medial plane for use in lifting the front wheels from the ground to swing the vehicle about the rear wheels for changing the direction or for use in lifting them to clear an obstruction.

2. A leg-propelled vehicle comprising a substantially horizontal flat seat, a body having side walls on which said seat is supported, a pair of rear ground-engaging wheels rotatable about an axis fixed with respect to said body, and a pair of front ground-engaging wheels rotatable about an axis fixed with respect to said body, said axes being parallel to each other, said seat extending on both sides of the medial vertical fore-and-aft plane of the vehicle, the medial portion of the seat being substantially directly above the rear axis, the rear axis being closed to the rear end of the body; the height of said seat being greater than the average knee length of persons using such vehicles and less than the average leg length of such persons, whereby the person may extend both legs over a side of the seat, the upper portion of the inner leg resting on the seat and the lower portion of said inner leg hanging down from said seat and with the foot of said inner leg held above the ground level, and the outer leg being used to propel the vehicle by engagement of the foot thereof with the ground, said seat having two edge portions on opposite sides of said medial plane a substantial distance forward of said medial portion of the seat and extending outwardly a substantial distance beyond the adjacent portions of the supporting body side walls to provide a pair of handles for use in lifting the front wheels from the ground to swing the vehicle about the rear wheels for changing the direction or for use in lifting them to clear an obstruction.

3. A leg-propelled vehicle comprising a substantially horizontal flat seat, a body having side walls on which said seat is supported, a pair of rear ground-engaging wheels rotatable about an axis fixed with respect to said body, and a pair of front ground-engaging wheels rotatable about an axis fixed with respect to said body, said axes being parallel to each other, said seat extending on both sides of the medial vertical fore-and-aft plane of the vehicle, the medial portion of the seat being substantially directly above the rear axis, the rear axis being close to the rear end of the body; the height of said seat being greater than the average knee length of persons using such vehicles and less than the average leg length of such persons, whereby the person may extend both legs over a side of the seat, the upper portion of the inner leg resting on the seat and the lower portion of said inner leg hanging down from said seat and with the foot of said inner leg held above the ground level, and the outer leg being used to propel the vehicle by engagement of the foot thereof with the ground, said seat having two edge portions on opposite sides of said medial plane a substantial distance forward of said medial portion of the seat and extending outwardly a substantial distance beyond the adjacent portions of the supporting body side walls to provide a pair of handles for use in lifting the front wheels from the ground to swing the vehicle about the rear wheels for changing the direction or for use in lifting them to clear an obstruction, said body having a load receptacle supported therein.

4. A leg-propelled vehicle comprising a substantially horizontal flat seat, a body having side walls on which said seat is supported, a pair of rear ground-engaging wheels rotatable about an axis fixed with respect to said body, and a pair of front ground-engaging wheels rotatable about an axis fixed with respect to said body, said axes being parallel to each other, said seat extending on both sides of the medial vertical fore-and-aft plane of the vehicle, the medial portion of the seat being substantially directly above the rear axis, the rear axis being close to the rear end of the body; the height of said seat being greater than the average knee length of persons using such vehicles and less than the average leg length of such persons, whereby the person may extend both legs over a side of the seat, the upper portion of the inner leg resting on the seat and the lower portion of said inner leg hanging down from said seat and with the foot of said inner leg held above the ground level, and the outer leg being used to propel the vehicle by engagement of the foot thereof with the ground, said seat having two edge portions on opposite sides of said medial plane a substantial distance forward of said medial portion of the seat and extending outwardly a substantial distance beyond the adjacent portions of the supporting body side walls to provide a pair of handles for use in lifting the front wheels from the ground to swing the vehicle about the rear wheels for changing the direction or for use in lifting them to clear an obstruction, with a tilt-limiting brake in the rear of the rear wheels brought into engagement with the roadway by extreme tilting movement of the brake.

5. A leg-propelled vehicle comprising a substantially horizontal flat seat, a body having side walls on which said seat is supported, a pair of rear ground-engaging wheels rotatable about an axis fixed with respect to said body, and a pair of front ground-engaging wheels rotatable about an axis fixed with respect to said body, said axes being parallel to each other, the faces of the two side walls extending adjacent the rims of the two rear wheels and lying in two generally parallel upright planes between which at least the major portions of the pair of said rear wheels lie, the medial portion of the seat being substantially directly above the rear axis, the rear axis being close to the rear end of the body; the height of said seat being greater than the average knee length of persons using such vehicles and less than the average leg length of such persons, whereby the person may extend both legs over a side of the seat, the upper portion of the inner leg resting on the seat and the lower portion of said inner leg hanging down from said seat and with the foot of said inner leg held above the ground level, and the outer leg being used to propel the vehicle by engagement of the foot thereof with the ground, said vehicle being provided with a pair of handles on opposite sides of said medial plane for use in lifting the front wheels from the ground to swing the vehicle about the rear wheels for changing the direction or for use in lifting them to clear an obstruction.

JOSEPH S. ZARAT.

REFERENCES CITED

The following references are of record in the file of this patent:

UNITED STATES PATENTS

| Number | Name | Date |
| --- | --- | --- |
| D. 88,687 | Swartz | Dec. 13, 1932 |
| 424,164 | Bankson | Mar. 25, 1890 |
| 1,440,012 | James | Dec. 26, 1922 |
| 1,890,658 | Swartz | Dec. 13, 1932 |
| 1,893,193 | Blackmore | Jan. 3, 1933 |